(12) United States Patent
Bures et al.

(10) Patent No.: US 6,827,640 B2
(45) Date of Patent: Dec. 7, 2004

(54) PORTABLE DUST COLLECTION SYSTEM

(75) Inventors: Steve Bures, Lone Tree, CO (US); Greg Shettlesworth, Highlands Ranch, CO (US)

(73) Assignee: S&G Company, LLC, Englewood, CO (US)

(*) Notice: Subject to any disclaimer, the term of this patent is extended or adjusted under 35 U.S.C. 154(b) by 0 days.

(21) Appl. No.: 10/379,180

(22) Filed: Mar. 3, 2003

(65) Prior Publication Data

US 2003/0220060 A1 Nov. 27, 2003

Related U.S. Application Data

(60) Provisional application No. 60/361,203, filed on Mar. 1, 2002.

(51) Int. Cl.[7] .............................................. B24B 55/06
(52) U.S. Cl. ....................................... 451/456; 451/453
(58) Field of Search ................................ 451/451, 453, 451/456; 125/13.01, 13.02; 30/124, 390; 144/252.1

(56) References Cited

U.S. PATENT DOCUMENTS

| | | | |
|---|---|---|---|
| 1,876,337 A | | 9/1932 | Mead |
| 3,882,598 A | * | 5/1975 | Earle et al. ................... 30/390 |
| 4,414,743 A | | 11/1983 | Pioch et al. |
| 4,675,999 A | | 6/1987 | Ito et al. |
| 5,074,044 A | * | 12/1991 | Duncan et al. ............... 30/124 |
| 5,084,972 A | | 2/1992 | Waugh |
| 5,167,215 A | * | 12/1992 | Harding, Jr. .............. 125/13.01 |
| 5,327,649 A | | 7/1994 | Skinner |
| 5,440,809 A | | 8/1995 | Padilla |
| 5,445,056 A | * | 8/1995 | Folci ........................... 83/100 |
| 5,675,895 A | | 10/1997 | Mori et al. |
| 6,047,693 A | * | 4/2000 | Yamami et al. .......... 125/13.01 |
| 6,155,246 A | | 12/2000 | Yamami et al. |
| 6,167,626 B1 | | 1/2001 | Doumani et al. |
| 6,219,922 B1 | | 4/2001 | Campbell et al. |
| 6,293,321 B1 | * | 9/2001 | Chiang .................... 144/252.1 |
| 6,318,352 B1 | | 11/2001 | Gnazzo et al. |
| 6,546,631 B2 | * | 4/2003 | Iida et al. ..................... 30/124 |

* cited by examiner

Primary Examiner—Dung Van Nguyen
(74) Attorney, Agent, or Firm—Sheridan Ross P.C.

(57) ABSTRACT

A dust collection system for use in connection with a portable power tool is provided. The dust collection system generally includes a dust collection port having an intake that is interconnected to an air impeller by an intake duct. The impeller is driven by a motor, to create a vacuum at the intake port of the dust collection port. The outlet of the air impeller is in communication with a dust collection volume. In operation, the dust collection system is fixed to a portable power tool. Dust created during sawing or other operations is collected by the dust collection port, and is drawn away from the location at which the dust is created by a vacuum established by the air impeller at the intake port. The dust thus collected is deposited in the dust collection volume, which may include a filter bag. The present invention provides for the efficient collection of potentially harmful particulates created during sawing or other operations, without adversely affecting the portability of the portable tool to which the system is affixed.

27 Claims, 8 Drawing Sheets

PORTABLE DUST COLLECTION SYSTEM

CROSS REFERENCE TO RELATED APPLICATION

Priority is claimed from U.S. Provisional Patent Application Ser. No. 60/361,203, filed Mar. 1, 2002, entitled "PORTABLE DUST COLLECTION SYSTEM," the entire disclosure of which is incorporated herein by reference in its entirety.

FIELD OF THE INVENTION

The present invention relates to a portable dust collection system. In particular, the present invention relates to the collection of dust created by portable power tools.

BACKGROUND OF THE INVENTION

The maintenance of safe environments for workers is of increasing concern. One area that has received attention in connection with worker safety is the reduction of harmful airborne particulates. For example, particulates created during concrete sawing operations, include silica dust, have become subject to government interest and regulation. Accordingly, a need exists to reduce airborne particulates in connection with concrete sawing and other operations.

One application that often requires the sawing of concrete materials involves the use of concrete tiles as roofing material. During such operations, tiles are commonly cut to size using portable power saws. Because the blades used to cut concrete operate by abrading the concrete material, a large amount of dust is created. When such sawing is performed within a confined space, or in still air, the level of particulates in the vicinity of the worker performing the sawing operation can exceed government standards and levels suggested by safe work practices.

In order to provide for the safety of workers performing dust-producing activities, respirators that provide filtered air to a wearer have been employed. However, respirators require a tight fit in order to be effective. Accordingly, they are difficult to size and difficult to put on. In addition, the tight fit required to ensure the effectiveness of the respirator is often uncomfortable for the user. These issues, in addition to the high cost of effective respirators, typically results in workers foregoing the use of such devices.

In order to prevent dust from entering the environment during sawing operations, shops having stationary tools may install elaborate fixed dust collection systems. However, such systems are not adaptable for use in connection with portable devices In order to control the dispersion of particulates created using portable power hand tools, collection bags have been used. However, existing systems are ineffective when used in connection with relatively fine particles, such as are created during concrete sawing operations. Other systems have been proposed that provide intakes that can be interconnected to a vacuum. However, such systems are inefficient, and do not provide a vacuum and dust collection bag system that is integrated with the portable power tool.

Accordingly, a need exists for a method and an apparatus to eliminate or reduce airborne particulate levels during sawing, sanding, and drilling operations performed using portable power tools. In particular, there is a need for a method and an apparatus for collecting particles produced during sawing, sanding and drilling operations that does not hinder the use of a portable power tool. Furthermore, there is a need for such a method and an apparatus that is reliable in operation and inexpensive to implement.

SUMMARY

In accordance with the present invention, a portable dust collection system for use in connection with portable power tools is provided. The system of the present invention generally provides an intake positioned near the location at which dust is produced by a portable power tool when that tool is in use. In addition, the system includes a motor that drives an impeller. The impeller is used to create a vacuum at the intake, and therefore to draw particulates into the intake. A dust collection volume is positioned at an outlet of the impeller to collect particulates drawn into the system at the inlet. The dust collection system is configured for mounting on a portable power tool, without significantly affecting normal use of the power tool or the portability of the power tool, while providing control of airborne particulates.

In accordance with an embodiment of the present invention, the intake is formed as part of or operates in cooperation with a dust collection plate or member. The dust collection plate is attached to the bottom of the foot of the saw. The inlet may be positioned in front of the saw blade, so that debris created during sawing operations will tend to be ejected towards the dust collection intake. In accordance with a further embodiment of the present invention, the dust collection intake may be positioned so that its opening is perpendicular to the foot of the saw.

According to embodiments of the present invention, operation of the portable dust collection system may be synchronized to operation of the saw. In particular, the switch used to control operation of the saw may also be used to control operation of the portable dust collection system.

In accordance with an embodiment of the present invention, a portable dust collection system is provided in the form of a kit, containing the component parts necessary to provide dust collection in connection with a portable, handheld saw. Accordingly, a dust collection plate assembly that can be affixed to the foot of a saw and having an integral or integrated dust collection port is provided. An impeller assembly that includes a bracket for conveniently attaching the impeller assembly to a portable saw is also provided. The impeller assembly includes a dust collector power supply cord. The power supply cord may be wired into the power supply switch of the saw. A replacement handle member that includes a recess or hole to provide access to the power supply switch by the dust collector power supply cord may also be included in the kit. Furthermore, a dust collection tube, such as in the form of a flexible hose, may be provided for interconnecting the dust collection port to the intake of the impeller assembly. Typically, a dust collection volume, for example in the form of a bag, is provided for connection to the outlet of the impeller assembly, to collect particles collected by the dust collection system. Various additional fasteners and components may also be provided as part of the kit. For example, an adaptor plate may be provided to assist in affixing the dust collection plate to the foot of the saw.

The present invention additionally provides a method for controlling dust created during sawing operations using portable saws. According to the method, a dust collection port is positioned in front of the saw blade of a portable saw, such that a significant proportion of the debris created during sawing operations is directed towards the dust collection port. According to embodiments of the present invention, the method includes positioning the dust collection port at or below a plane defined by the foot of the saw. The method additionally includes creating a vacuum at the dust collection port, and depositing particles collected at the dust collection port in a dust collection volume.

Additional advantages of the present invention will become readily apparent from the following discussion, particularly when taken together with the accompanying drawings.

DETAILED DESCRIPTION

Figure 1A:
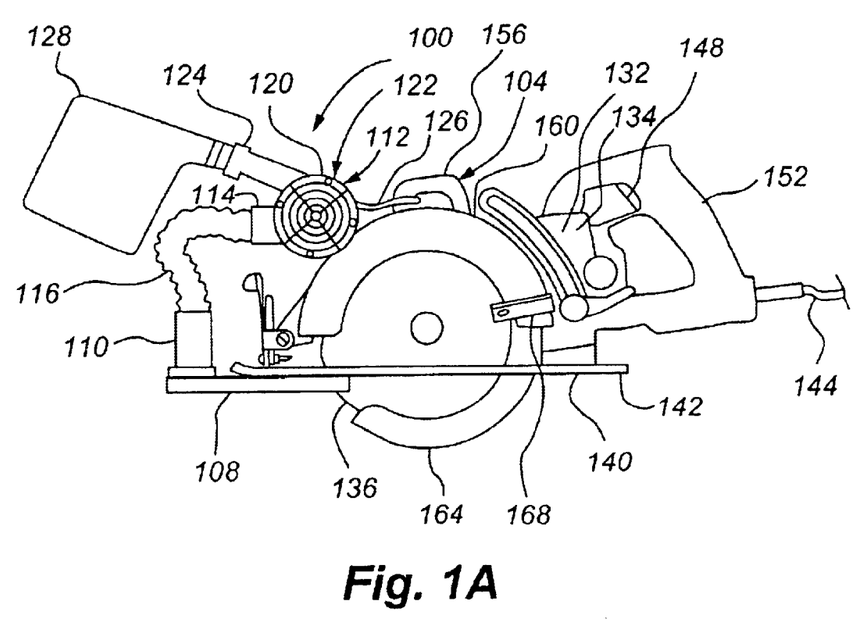
FIG. 1A is a left side elevation of a portable dust collection system in accordance with an embodiment of the present invention, interconnected to a portable circular saw.
Figure 1B:
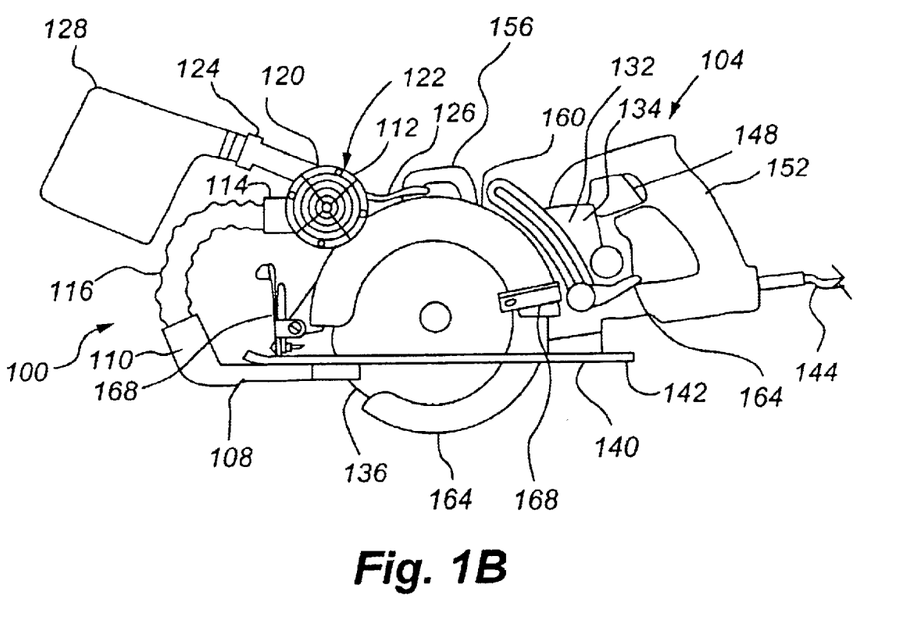
FIG. 1B is a left side elevation of a portable dust collection system in accordance with another embodiment of the present invention, interconnected to a portable circular saw.

With reference now to FIGS. 1A and 1B, embodiments of a portable dust or particle collection system 100 in accordance with the present invention are illustrated, interconnected to a portable circular saw 104. In general, a portable dust collection system 100 in accordance with the present invention includes a dust or particle collection plate assembly 108 having or interconnected to a dust collection outlet 110, that is in turn interconnected to an air impeller housing 112 inlet port 114 by a dust collection tube 1116. In addition, the dust collection system 100 includes an impeller motor 120, such as a high speed electric motor, for driving the air impeller. The air impeller, air impeller housing 112 and the motor 120 comprise an impeller assembly 122. Power may be supplied to the motor 120 by a dust collection power supply cord 126. The impeller assembly 122 further includes a discharge or outlet port 124 that is interconnected to a dust or particle collection volume 128. In accordance with an embodiment of the dust collection system 100 illustrated in FIG. 1, the dust collection volume 128 is a dust collection bag.

The portable saw 104 generally includes a saw motor 132, a motor housing 134, a saw blade 136, and a base plate or foot 140. The bottom surface 142 of the base plate or foot 140 defines a plane. As can be appreciated by one of skill in the art, the saw 104 and/or material to be cut is positioned so that the material to be cut is adjacent the bottom surface 142 of the base plate 140. Accordingly, sawing or cutting operations take place on a side of the plane defined by the foot 140 opposite the motor 132. A saw power supply cord 144 may be provided for interconnecting the portable saw 104 to a source of electrical power. A power supply switch 148 allows the operator to selectively operate the saw 104. In accordance with an embodiment of the present invention, the saw power supply cord 144 supplies power to both the saw motor 132 used to operate the saw blade 136, and the impeller motor 120 used to rotate the impeller of the portable dust collection system 100. In addition, the power supply switch 148 may operate both the portable saw 104 and the portable dust collection system 100. Accordingly, the dust collector power supply cord 126 may be wired into the power supply switch 148. Alternatively, a separate power supply switch may be provided for operating the dust collection system 100.

The portable saw 104 will also generally include a handle 152, an auxiliary handle 156, an upper guard 160, a moveable lower guard 164, and a lower guard lift lever 168. A depth adjustment mechanism 164 and a bevel adjustment mechanism 168 may also be provided.

In general, the portable dust collection system 100 is fixed to the portable saw 104. For instance, the dust collection plate assembly 108 may be fixed to the base plate 140 of the portable saw 104. The impeller assembly 122 is, according to the embodiments illustrated in FIGS. 1A and 1B, fixed to the portable saw 104 by a mounting bracket 312 (shown in FIGS. 3A and 3B). Therefore, the portable dust collection system 100 generally moves as a unit with the portable saw 104.

Figure 2A:
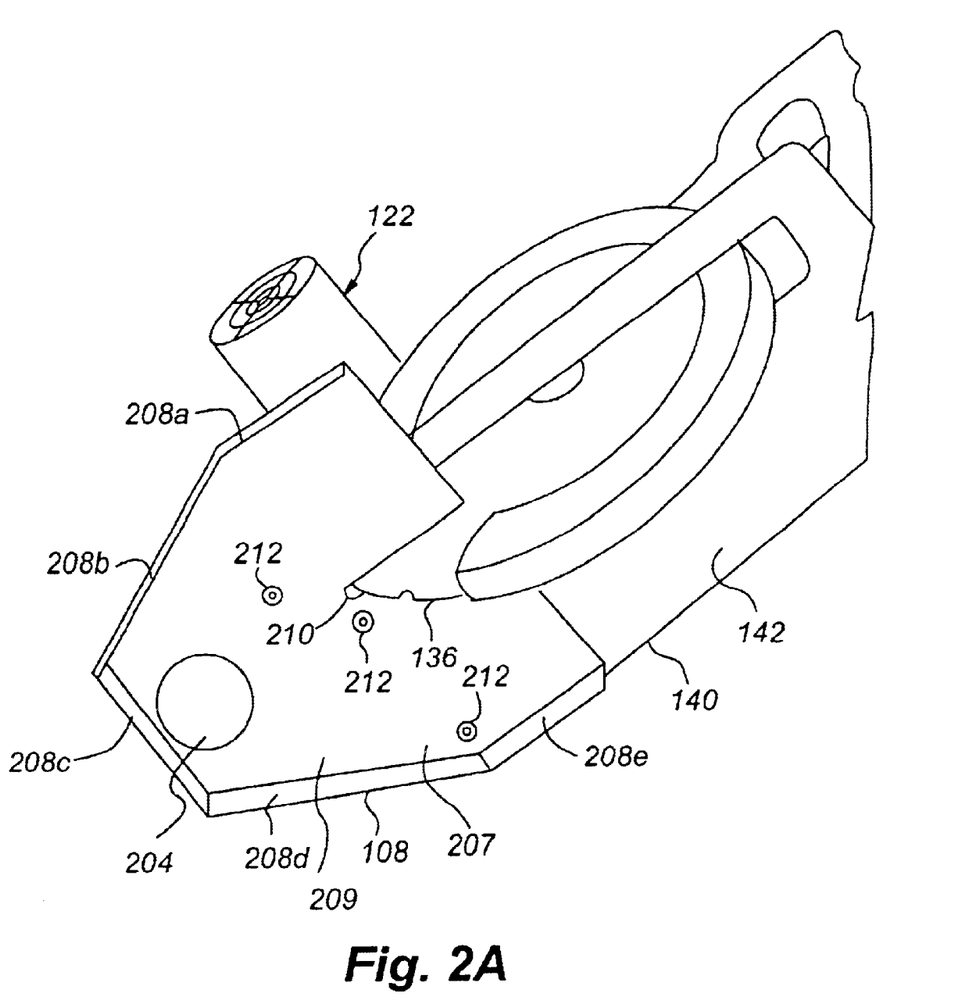
FIG. 2A is a bottom perspective view of the intake and dust collection plate of the embodiment of FIG. 1A.

With reference now to FIG. 2A, an embodiment of the portable dust collection system 100 illustrated in FIG. 1A shown interconnected to a portable saw 104 from a bottom perspective view. In FIG. 2A, the dust collection plate assembly 108 can be seen to include a dust collection intake port 204, and dust collection shields or skirts 208a–208e formed along the sides of a dust collection plate 207, defining an intake volume 209. A slot 210 may be formed in the dust collection plate assembly 108 to provide clearance for the saw blade 136. The dust collection plate assembly 108 may be formed from a durable material. For example, the dust collection plate assembly 108 may comprise a dust collection plate 207 made from steel or another metal with folded sides to form the skirts 208. Also visible in FIG. 2A are fasteners 212, which fix the dust collection plate assembly 108 to the saw base plate 140. As shown in FIG. 2A, an embodiment of the portable dust collection system 100 may position the dust collection intake port 204 ahead of the saw blade 136 and in a plane that is substantially parallel to the plane of the bottom surface 142 of the base plate 140. The skirts 208 are generally perpendicular to the plane defined by the bottom surface 142 of the base plate 140 to promote the collection of debris created during sawing operations at the dust collection intake port 204.

Figure 2B:
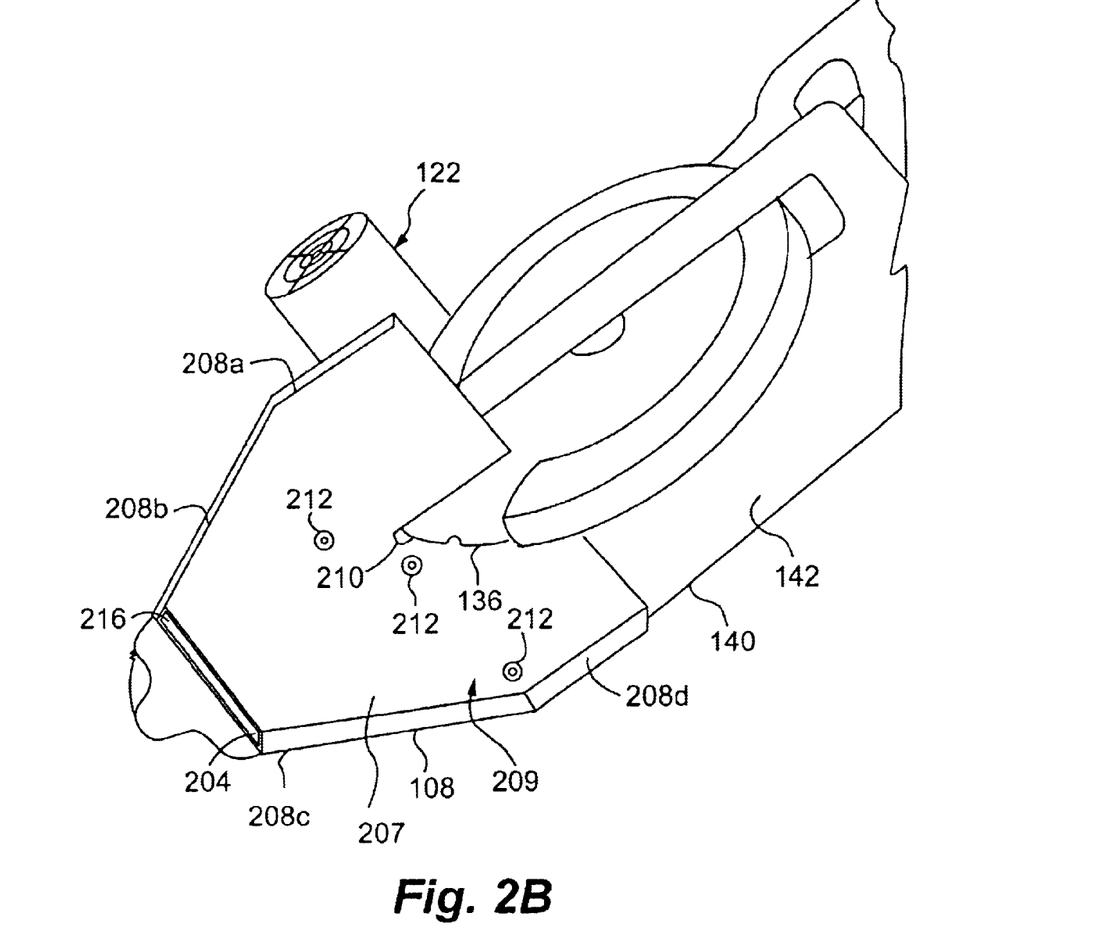
FIG. 2B is a bottom perspective view of the intake and dust collection plate of the embodiment of FIG. 1B.

With reference now to FIG. 2B, an embodiment of the portable dust collection system 100 illustrated in FIG. 1B is shown interconnected to a portable saw 104 from a bottom perspective view. In FIG. 2B, the dust collection plate assembly 108 includes a dust collection intake port 204 having an opening 216 that is substantially perpendicular to the plane defined by the bottom surface 142 of the saw base plate 140. Dust collection shields or skirts 208 are provided as part of the dust collection plate assembly 108 to form an intake volume 209. In accordance with an embodiment of the present invention, the dust collection plate 207 is formed from metal and has integral skirts 208.

In operation, the saw blade 136 rotates in a clockwise direction when viewed from the side of the portable saw 104 illustrated in FIGS. 1 and 2. Furthermore, it can be appreciated that particles created during sawing operations generally travel in a direction that is tangential to the saw blade 136 at the point of contact between the saw blade 136 and the material in which the cut is being made, and in the same direction that the saw blade 136 is traveling. Accordingly, the dust collection intake port 204 is advantageously positioned as shown in the embodiments illustrated in FIGS. 1A, 1B, 2A and 2B to collect dust created during sawing operations.

Figure 3A:
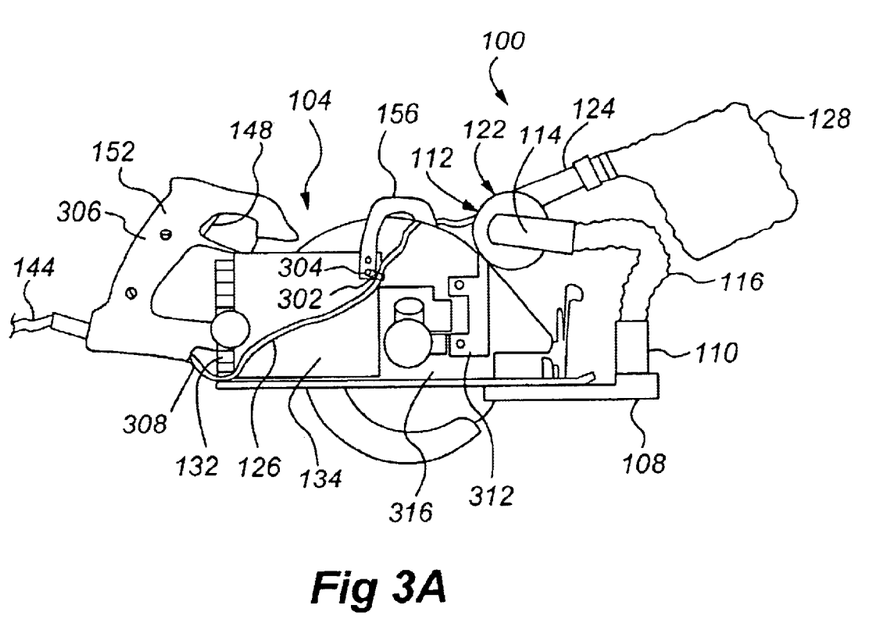
FIG. 3A is a right side elevation of the embodiment of FIG. 1A.
Figure 3B:
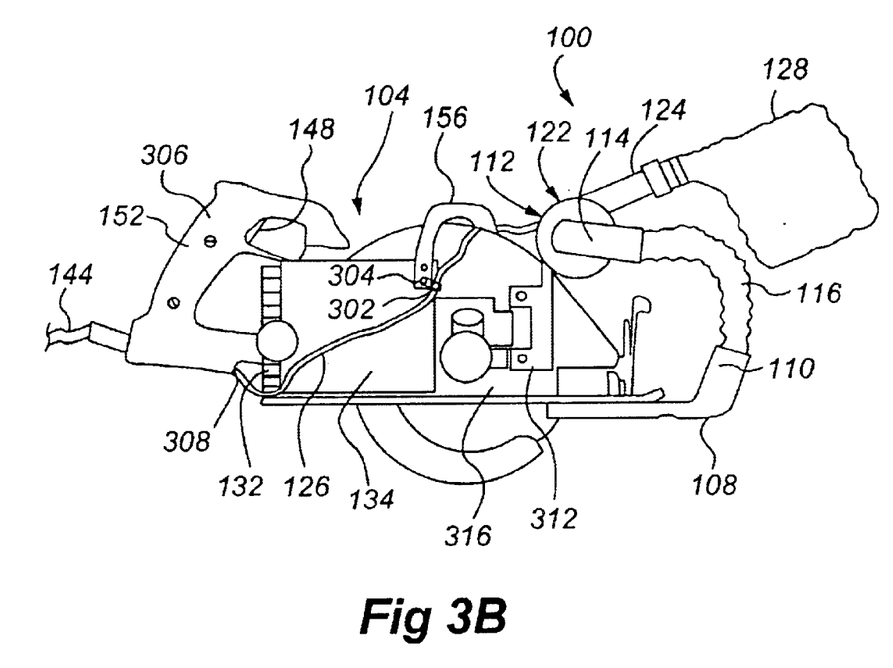
FIG. 3B is a right side elevation of the embodiment of FIG. 1B.

With reference now to FIGS. 3A and 3B, the portable dust collection systems 100 and portable saw 104 illustrated in FIGS. 1A, 1B, 2A and 2B are illustrated from the side opposite that illustrated in FIGS. 1A and 1B. In FIGS. 3A and 3B, the dust collection tube 116 can be seen interconnecting the dust collection outlet 110 of the dust collection plate assembly 108 to the inlet 114 of the air impeller 112. Also visible in FIGS. 3A and 3B is the routing of the dust collection power supply cord 126. In general, the dust collection power supply cord 126, in the illustrated embodiments, interconnects the impeller motor 120 of the impeller assembly 122 to the saw power supply cord 144. According to an embodiment of the present invention, the dust collector power supply cord 126 is interconnected to the saw power supply cord 144 through the saw's power supply switch 148. Accordingly, the motor 120 is only operated when the saw 104is in operation. Alternatively, the dust collector power supply cord 126 may be connected to the saw power supply cord 144 directly, allowing operation of the motor 120 of the air impeller assembly 122 independently of the saw 104. According to still other embodiments of the present invention, the dust collector power supply cord 126 may be independently interconnected to an external source of power.

In accordance with embodiments of the present invention, the dust collector power supply cord 126 is attached to the saw 104 at various locations, to ensure that the dust collector power supply cord 126 does not interfere with operation of the saw 104. For example, tabs 302 for holding the dust collector power supply cord 126 may be affixed to the saw 104 using fasteners that are already provided as part of the saw 104. For example, fasteners 304 used to affix the auxiliary handle 156 to the motor housing 134 may also be used to secure such a tab 302. For embodiments in which the dust collector power supply cord 126 is interconnected to the saw power supply cord 144, either directly or through the power supply switch 148, a removable half 306 of the handle 152 may be provided with a hole or recess 308 where the dust collector power supply cord 126 enters the handle 152.

Also visible in FIGS. 3A and 3B is a impeller assembly mounting bracket 312. The impeller mounting bracket 312 may be interconnected to the gear housing 316 of the saw 104. In accordance with an embodiment of the present invention, the impeller assembly mounting bracket 312 is mounted to the gear housing 316 using fasteners and corresponding holes provided as part of the saw 104. According to still other embodiments, extended length fasteners are provided to replace fasteners included as part of the saw 104, to accommodate the thickness of the bracket 312.

Figure 4:
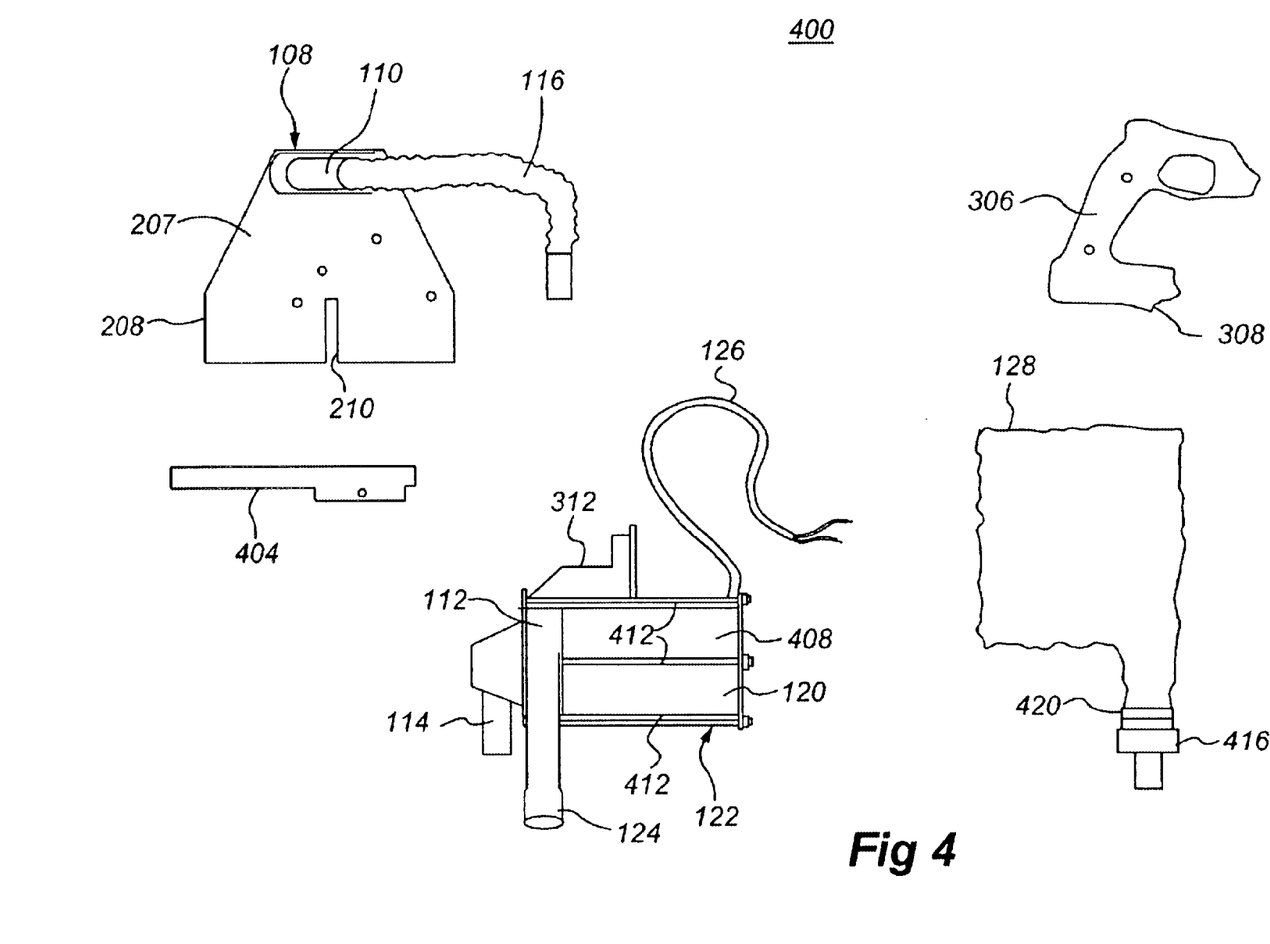
FIG. 4 illustrates the components of a portable dust collection kit in accordance with an embodiment of the present invention.

With reference now to FIG. 4, a kit 400, the components of which can be interconnected to a portable saw to form a portable dust collection system 100 in accordance with an embodiment of the present invention are illustrated. As shown in FIG. 4, the major components of the portable dust collection system 100 include the dust collection plate assembly 108, the air impeller assembly 122, and dust collection volume 128. The kit 400 may additionally include a removable half 306 of the handle 152 that provides a recess or hole 308 for receiving the dust collector power supply cord 126. Furthermore, embodiments of the kit 400 may provide an adaptor bracket 404 to assist in affixing the dust collection plate assembly 108 to a saw 104.

As depicted in FIG. 4, the dust collection plate assembly 108 provided as a part of a kit 400 may have an integral dust collection outlet 110, or may have a separate dust collection outlet 110 that is already affixed to the dust collection plate 207. Furthermore, the dust collection tube 116 may already be interconnected to the dust collection outlet 110. Alternatively, the various components of the dust collection plate assembly 108 may be provided separately for assembly by the user.

The impeller assembly 122 is generally provided as a preassembled unit. The impeller assembly 122 thus includes an impeller motor 120 and attached impeller (not shown) located within the air impeller housing 112, which provides an inlet 114 and an outlet 124. In addition, the impeller assembly 122 may include a motor housing 408 to protect the motor 120 and to provide a durable impeller assembly 122. The mounting bracket 312 may then be rigidly affixed to the housing 408. Alternatively or in addition, the mounting bracket 312 may be interconnected to the remainder of the impeller assembly 122 by fasteners 412 that may also be used to secure various components of the impeller assembly 122 to one another. The impeller assembly 122 is further provided with a dust collector power supply cord 126, ready for interconnection to the saw power supply cord 144.

The dust collection volume 128 may be provided with a mating fixture 416, to provide for the convenient interconnection of the bag 128 to the outlet 124 of the impeller assembly 122. The dust collection volume 128 may be interconnected to the fixture 416 by a clamp 420 and/or an adhesive. As can be appreciated by one of skill in the art, the mating fixture 416 may alternatively be provided as part of the impeller assembly 122. The dust collection volume 128 may comprise a bag that is made from or incorporates a material that is capable of filtering and thus removing particles created during sawing operations and provided to the interior of the dust collection volume 128 by the outlet, 124.

Figure 5:
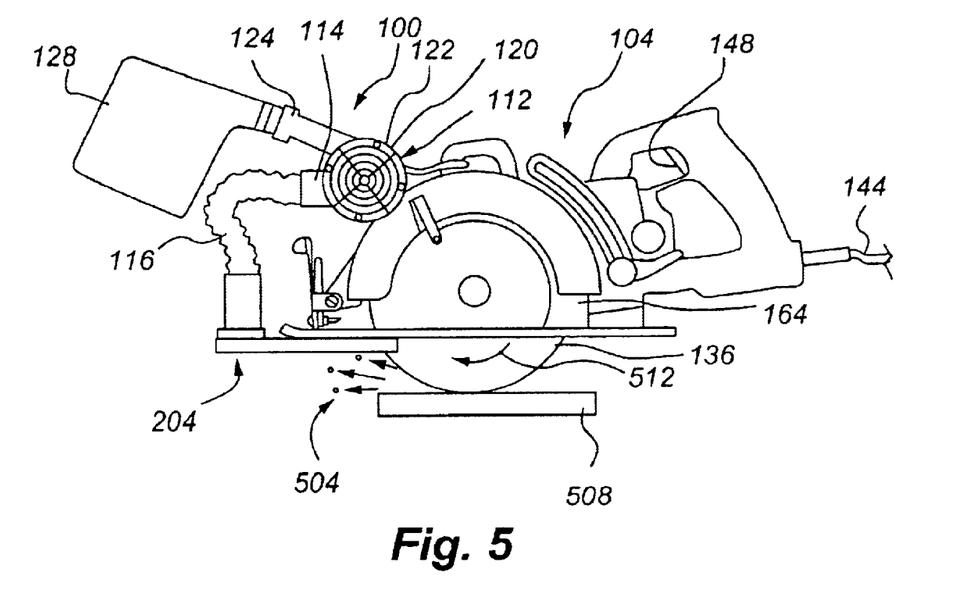
FIG. 5 depicts the use of a portable saw having a portable dust collection system in accordance with an embodiment of the present invention to cut a piece of material.

The use of a dust collection 'system 100 in connection with a portable saw 104 is depicted in FIG. 5. In general, the portable dust collection system 100 is operated in conjunction with operation of the portable saw 104. That is, when the portable saw 104 is being used to perform a cutting operation, the dust collection system 100 is turned on to collect dust generated during the cutting operation. Accordingly, as noted above, the dust collection system 100 and the portable saw 104 may share a single power switch 148 and power supply cord 144. When power is supplied to the portable dust collection system 100, the impeller motor 120 operates to rotate the air impeller. In particular, the motor 120 may rotate a turbine or squirrel cage-type unit, or any other configuration of air impeller, capable of displacing air. Operation of the air impeller by the motor 120 creates a vacuum at the inlet 114 of the air impeller housing 112. The inlet 114 is interconnected to the dust collection intake 108 by the dust collection tube 116. Accordingly, a vacuum is formed at the dust collection port 204. This vacuum draws dust and particles 504 created at the interface between the saw blade 136 and the material 508 being cut into the dust collection port 204. As shown by arrow 512 in FIG. 5, the outside edge of the blade 136 generally travels from the point of contact with the material being cut towards the dust collection port 204. Accordingly, the dust collection port 204 is advantageously positioned to collect dust and particles 504, and to therefore reduce the amount of dust and particles 504 entering the atmosphere.

The dust and particles 504 collected by the dust collection port 204 is drawn through the dust collection tube 116, the inlet 308, past the air impeller, and out the impeller outlet 124. The dust is then collected in a collection volume 128.

For example, the collection volume 128 may comprise a filter bag that is capable of filtering from the air stream particulates and dust 504 collected at the dust collection port 208. The dust collection volume 128 may be removed from the air impeller outlet 124 for emptying or disposal. In accordance with another embodiment of the present invention, the dust collection volume 128 comprises a centrifuge-type air filter.

The present invention also provides a method for collecting dust, particles and debris created during sawing or cutting operations. According to the method, a vacuum is created in a volume adjacent to the point at which a saw blade or other component of a cutting device contacts a material being cut. For example, where the method is employed in connection with a circular saw, the vacuum is created in an area towards which debris created during the sawing operation is directed by the saw blade. In order to promote the collection of debris at the intake port, skirting may be provided.

The vacuum is created using an impeller driven by a motor. The motor may be provided separately, or may be the same motor used to power the saw blade. Dust collected at the inlet is deposited in a dust collection volume.

Although the embodiments of the present invention that are particularly useful in connection with a circular saw have been discussed, the invention is not so limited. For example, the present invention may be adapted for use in connection with portable drills, sanders, or reciprocating saws. In addition, the present invention is not limited for used in connection with corded power tools. For instance, the present invention may be used in connection with battery-operated portable tools. Furthermore, the present invention may be provided with a dedicated battery-type power supply for operation of the motor 120. As yet a further embodiment, the present invention may draw power for the motor 120 from the same source used to power the portable device, but using a separate interconnection to that source. In addition to battery-type power supplies, fuel cell-type power supplies may be used.

In accordance with yet another embodiment of the present invention, the air impeller may be driven by the same motor utilized to actuate the cutting mechanism of the portable device. For example, the air impeller may be driven through a belt and pulley arrangement, or other power takeoff arrangement, from the motor used to move the cutting or abrading surface of a portable power tool. In general, the present invention may be applied in connection with any portable power tool in connection with which the control of dust created through use of the power tool is desirable. Furthermore, embodiments of the present invention provide a dust collection system that can easily be added to a portable saw.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A portable dust collection system, comprising:
   a dust collection plate assembly comprising an intake port;
   a dust collection tube, wherein a first end of said dust collection tube is in communication with said intake port;
   an impeller assembly, wherein a second end of said dust collection tube is in communication with said impeller assembly, wherein said impeller assembly is operable to create a vacuum at said intake;
   a dust collection volume in communication with a discharge port of said impeller assembly, whereby particles collected at said intake port are deposited in said dust collection volume;
   a tool base plate; and
   a saw blade operable to cut a material on a first side of said tool base plate wherein said dust collection plate assembly is interconnected to said tool base plate on said first side of said tool base plate.

2. The system of claim 1, wherein said dust collection plate assembly further comprises skirts, wherein an intake volume is defined about said intake port.

3. The system of claim 1, wherein said impeller assembly comprises:
   an impeller motor; and
   an impeller, wherein said impeller motor drives said impeller, and wherein said impeller motor has a position that is fixed with respect to said tool base plate.

4. The system of claim 1, wherein said intake port is substantially parallel to said tool base plate.

5. The system of claim 1, wherein said opening of said intake port is substantially perpendicular to said tool base plate.

6. The system of claim 1, wherein said tool base plate is associated with a portable saw, and wherein an impeller of said impeller assembly is driven by a motor also powering said saw blade.

7. The system of claim 1, wherein material removed by said blade is projected substantially along a line that is tangent to the saw blade at a point of contact between said saw blade and a material being cut in a direction that coincides to a direction of travel of an edge of said saw blade at said point of contact, and wherein said intake is positioned within about 45° of said line.

8. The system of claim 1, further comprising at least one of a casing and a saw guard, and wherein said at least one of a casing and saw guard does not comprise said dust collection plate assembly.

9. The system of claim 1, wherein a position of said dust collection plate assembly intake port is fixed with respect to said tool base plate.

10. The system of claim 1, wherein dust collection plate assembly comprises a dust collection plate, and wherein said dust collection plate lies in a plane that is not parallel to a plane within which said saw blade lies.

11. The system of claim 1, wherein said dust collection plate assembly is formed from metal.

12. The system of claim 1, further comprising:
    a power supply cord.

13. A portable dust collection system, comprising:
    a dust collection plate assembly comprising an intake port;
    a dust collection tube, wherein a first end of said dust collection tube is in communication with said intake port;

an impeller assembly, wherein a second end of said dust collection tube in communication with said impeller assembly, wherein said impeller assembly is operable to create a vacuum at said intake;

a dust collection volume in communication with a discharge port of said impeller assembly, whereby particles collected at said intake port are deposited in said dust collection volume; and a power supply cord.

14. The system of claim 13, wherein said dust collection plate assembly further comprises skirts, wherein an intake volume is defined about said intake port.

15. A portable dust collection system, comprising:

a dust collection plate assembly comprising an intake port, wherein said dust collection plate assembly is formed from metal;

a dust collection tube, wherein a first end of said dust collection tube is in communication with said intake port;

an impeller assembly, wherein a second end of said dust collection tube is in communication with said impeller assembly, wherein said impeller assembly is operable to create a vacuum at said intake; and a dust collection volume in communication with a discharge port of said impeller assembly, whereby particles collected at said intake port are deposited in said dust collection volume.

16. The system of claim 15, wherein said dust collection plate assembly further comprises skirts, wherein an intake volume is defined about said intake port.

17. The system of claim 15, further comprising:

a power supply cord.

18. A portable dust collection device, comprising:

a dust collection plate assembly, comprising:
  a dust collection outlet;
  a dust collection plate;
  a dust collection intake port formed in said dust collection plate and in communication with said dust collection outlet;
  at least a first dust collection skirt;

a dust collection volume; and an impeller assembly, comprising:
  an outlet port in communication with said dust collection volume;
  an inlet port in communication with said dust collection outlet of said dust collection plate assembly; and a power cord.

19. The device of claim 18, further comprising:

a mounting bracket operable to interconnect said impeller assembly to a portable tool.

20. The device of claim 18, further comprising:

a handle member, wherein said handle member includes at least one of a hole and a recess sized to accept said power cord.

21. The kit of claim 18, further comprising a mounting adapter operable to interconnect said dust collection plate to a tool base plate.

22. The kit of claim 18, wherein said dust collection skirt is formed from metal.

23. The kit of claim 18, wherein said dust collection skirt and said dust collection plate are integral to one another.

24. A portable dust collection device, comprising:

a dust collection plate assembly, comprising:
  a dust collection outlet;
  a dust collection plate, wherein said dust collection plate further comprises mounting holes for accepting fasteners;
  a dust collection intake port formed in said dust collection plate and in communication with said dust collection outlet; and
  at least a first dust collection skirt;

a dust collection volume; and an impeller assembly, comprising:
  an outlet port in communication with said dust collection volume;
  an inlet port in communication with said dust collection outlet of said dust collection plate assembly.

25. The device of claim 24, further comprising: a mounting bracket operable to interconnect said impeller assembly to a portable tool.

26. The kit of claim 24, wherein said dust collection skit is formed from metal.

27. The kit of claim 24, wherein said dust collection skirt and said dust collection plate are to one another.

* * * * *

UNITED STATES PATENT AND TRADEMARK OFFICE
CERTIFICATE OF CORRECTION

PATENT NO.    : 6,827,640 B2
DATED         : December 7, 2004
INVENTOR(S)   : Bures et al.

It is certified that error appears in the above-identified patent and that said Letters Patent is hereby corrected as shown below:

Column 10,
Line 42, after "are" insert -- integral --;

Signed and Sealed this

Twenty-second Day of February, 2005

JON W. DUDAS
*Director of the United States Patent and Trademark Office*